(12) United States Patent
Hough

(10) Patent No.: US 6,282,027 B1
(45) Date of Patent: Aug. 28, 2001

(54) ZOOMABLE BEAMSPREADER WITH MATCHED OPTICAL SURFACES FOR NON-IMAGING ILLUMINATION APPLICATIONS

(75) Inventor: Thomas A. Hough, Dallas, TX (US)

(73) Assignee: Vari-Lite, Inc., Dallas, TX (US)

( * ) Notice: Subject to any disclaimer, the term of this patent is extended or adjusted under 35 U.S.C. 154(b) by 0 days.

(21) Appl. No.: 09/280,792

(22) Filed: Mar. 26, 1999

(51) Int. Cl.[7] .................................................. G02B 27/10
(52) U.S. Cl. .......................... 359/618; 359/622; 359/623; 359/626; 362/297
(58) Field of Search .................................... 359/618, 621, 359/622, 623, 624, 625, 626; 362/297, 331, 268

(56) References Cited

U.S. PATENT DOCUMENTS

| | | | |
|---|---|---|---|
| 2,076,240 | 4/1937 | Levy | 362/281 |
| 2,650,292 | 8/1953 | Strong | 362/268 |
| 2,950,382 | 8/1960 | Hatch | 362/281 |
| 3,302,016 | 1/1967 | Larraburu | 362/268 |
| 3,428,800 | 2/1969 | Levin et al. | 362/309 |
| 3,594,566 | 7/1971 | Knelsley | 362/268 |
| 3,665,179 | 5/1972 | McLintic | 362/293 |
| 4,462,067 | 7/1984 | Altman | 362/268 |
| 4,519,020 | 5/1985 | Little | 362/268 |
| 4,602,321 | 7/1986 | Bornhorst | 362/268 |
| 4,630,902 * | 12/1986 | Mochizuki et al. | 359/432 |
| 4,632,522 * | 12/1986 | Ishitani | 359/432 |
| 4,709,311 | 11/1987 | Bornhorst | 362/277 |
| 4,739,456 | 4/1988 | Little | 362/268 |
| 4,779,176 | 10/1988 | Bornhorst | 353/62 |
| 4,867,514 | 9/1989 | Waldron | 359/355 |
| 5,029,992 | 7/1991 | Richardson | 359/969 |
| 5,237,367 | 8/1993 | Kudo | 355/67 |
| 5,404,283 | 4/1995 | Yantz et al. | 451/39 |
| 5,581,379 | 12/1996 | Aoyama et al. | 349/5 |
| 5,598,281 * | 1/1997 | Zimmerman et al. | 349/5 |
| 5,684,567 * | 11/1997 | Shiozawa | 355/53 |
| 5,774,273 | 6/1998 | Bornhorst | 359/665 |
| 5,775,799 * | 7/1998 | Forkner | 362/268 |
| 5,786,939 * | 7/1998 | Wantanabe | 359/621 |
| 5,805,340 * | 9/1998 | Kelly | 359/574 |

FOREIGN PATENT DOCUMENTS 0757280  2/1997 (EP) .
8083743  3/1996 (JP) .

* cited by examiner

Primary Examiner—Georgia Epps
Assistant Examiner—Timothy J Thompson
(74) Attorney, Agent, or Firm—Carr & Storm, L.L.P.

(57) ABSTRACT

A zoomable light beam spreader comprising first and second multiple-lens arrays includes a plurality of plano-convex lenses in correspondence with a plurality of plano-concave lenses having matched, curved optical surfaces. In a zero-power state, the two multiple-lens arrays are very closely spaced so that the matched convex and concave surfaces effectively cancel each other optically but, as the two arrays are separated coaxially along the axis of a light beam, beam divergence angle increases as a function of the distance of separation. A large amount of beam divergence is obtained when the curved surfaces of the plano-concave lenses of the second array are positioned beyond the focus points of the plano-convex lenses of the first array.

34 Claims, 7 Drawing Sheets

ZOOMABLE BEAMSPREADER WITH MATCHED OPTICAL SURFACES FOR NON-IMAGING ILLUMINATION APPLICATIONS

FIELD OF THE INVENTION

The present invention relates to lighting instruments, and especially to devices and apparatus for controlling the distribution of light energy in non-imaging illumination applications.

DESCRIPTION OF RELATED ART

Four qualities of lighting as described by Stanley McCandless in his book "A Method of Lighting the Stage" are intensity, color, distribution, and movement. Whereas intensity and color may be said to refer to attributes of particular light beams, distribution refers to the arrangement of light sources about the stage and the directions in which they are aimed. Intensity, color, and distribution are primary qualities, whereas movement is emergent from changes in the primary qualities. Movement in this sense occurs as the condition of the other three qualities changes over time. A simple adjustment of intensity results in movement. No change in any of the other three qualities can occur without resulting in movement, and movement cannot occur without the passage of time from moment to moment.

The passage of time, over the years, has seen all three of the primary qualities of lighting become subject to motorized mechanization and computerized remote control so that in the case of distribution, movement (in a conventional sense) has become overtly mechanized. Moving lights, virtually unheard of twenty years ago, have revolutionized the art of lighting the stage, enabling dynamic lighting effects not possible before the advent of computer-controlled lighting systems having automatically variable qualities. After the novelty of overtly dynamic movement subsides, an appreciation of subtlety once again becomes possible so that we might consider the quality of distribution from the aspect of variable beam divergence or beam spread.

In stage lighting, it is often desirable to expand the light beam from a so-called wash luminaire to illuminate a broader area. A wash luminaire can produce such an effect using a light source and a concave reflector which are moveable with respect to a lens, such as disclosed in U.S. Pat. No. 3,428,800 or in U.S. Pat. No. 3,665,179. The divergence angle of the light beam varies depending upon the position of the source and reflector with respect to the lens. Popular variable-divergence luminaires, such as the Cadenza PC manufactured by Rank Strand of the United Kingdom and the 2KW Fresnel manufactured by Mole-Richardson of California and others, use such an optical system to control the divergence angle of the light beam projected by the luminaire. A positive, or convex, front lens illuminated by a lamp and retroreflector combination produces a substantially columnar light beam and projects a relatively small pool of light when the lamp is placed at the focus of the lens. As the lamp and reflector combination is moved in either direction away from the focus of the lens, the beam diverges from columnar to project a larger pool of light. Such a system is quite large and requires many inches of travel for the lamp and reflector combination along the optical axis of the lens. The carrier mechanism of these luminaires is typically manually adjustable and the large glass front lens, typically eight to ten inches in diameter, is thick and heavy even with the significant weight reduction gained by the Fresnel design used by Mole-Richardson.

Another common system for controlling the divergence angle of a light beam is disclosed in U.S. Pat. No. 4,602,321 and uses a lamp which is movable with respect to a parabolic reflector. When the lamp is placed at the focus of the reflector, a substantially columnar light beam emerges and projects a small pool of light. As the lamp is moved rearwardly along the optical axis of the reflector and away from the focus of the reflector, the beam diverges from columnar to form a larger pool of light. This system requires an adjustable carriage for the lamp socket and frequently requires provisions for minor (manual) adjustments along two additional axes orthogonal to the optical axis, so as to maintain proper alignment of the lamp on the optical axis, in addition to motorized adjustment along the optical axis for controlling beam divergence.

Many commonly used systems for controlling the divergence angle of a light beam use two or more lens elements is series and in combination with a fixedly mounted lamp and a fixedly mounted reflector. In these systems, one or more of the lens elements are movable with respect to the lamp and reflector to vary the divergence angle of a light beam formed thereby. Some common examples are disclosed in U.S. Pat. Nos. 2,076,240; 2,650,292; 2,950,382; 3,302,016; 3,594,556; 4,462,067; 4,519,020; 4,709,311; 4,739,456; 5,029,992; 5,404,283; among others. Some of these systems are used in image-projecting applications in which a hard-edged spot of light is projected onto a distant surface such as a stage floor or backdrop, and may also be used to project complex images formed by objects placed in a focal plane of the projection lens system, such as described, for example, in U.S. Pat. No. 4,779,176.

Another, unique system for controlling the energy distribution of a light beam in a non-imaging application is disclosed in U.S. Pat. No. 5,774,273 and uses a variable-geometry liquid-filled lens having a deformable, transparent membrane supported by a transparent, multi-cellular structure forming an array of variable-power lenslets. An optically clear liquid is pumped into or out of the structure to deform the membrane into an array of convex or concave lenslets having adjustable optical power to control energy distribution. A motorized pump is used as the actuator, and the system may be operated by remote control. It is nevertheless desirable to have a solid-state apparatus, not relying upon liquid components, for controlling the energy distribution of a light beam in non-imaging applications, which apparatus can economically be made large in diameter and yet be light-weight and operable over a short distance along the optical axis of a luminaire.

SUMMARY OF THE INVENTION

The present invention provides a solid-state apparatus which is economically made, is scalable to large diameters yet operates over a short distance along the optical axis of a luminaire to control the distribution of light energy in non-imaging illumination applications.

In accordance with the present invention, an apparatus for controlling divergence of a beam of light comprises a first multiple-lens array including a plurality of plano-convex lenses arranged in a pattern and supported on a transparent substrate; a second multiple-lens array including a plurality of plano-concave lenses arranged in a pattern and supported on a transparent substrate, the first and second multiple-lens arrays being formed so that a curvature of convex lens surfaces of the first array matches a curvature of concave surfaces of the second array, and each convex lens surface of the first array corresponds to and is aligned with a matching concave lens surface of the second array; the first and second multiple-lens arrays being disposed serially and coaxially in a light beam path such that convex lens surfaces of the first array are generally adjacent and coaxially aligned with concave surfaces of the second array; and one of the multiple-lens arrays being movable coaxially with respect to the other multiple-lens array.

DETAILED DESCRIPTION

Figure 1:
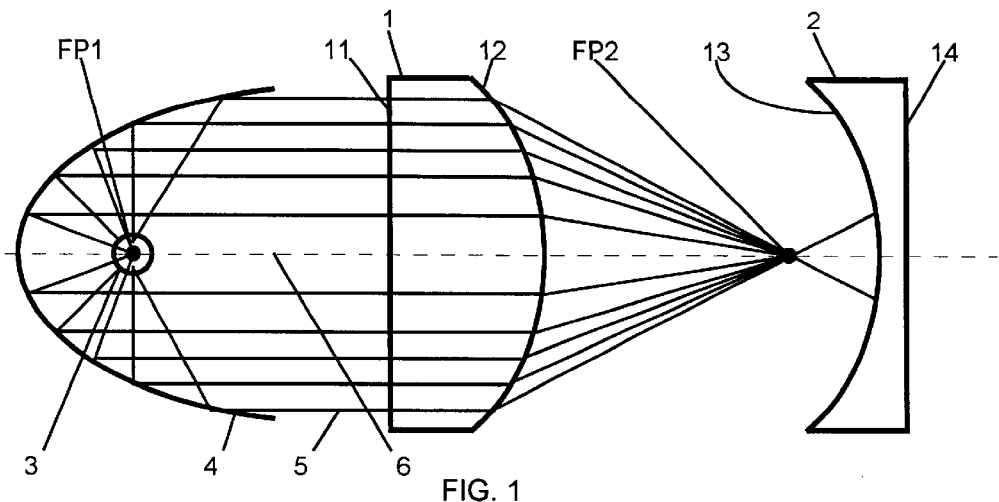
FIGS. 1 through 5 are plan views of an illumination optical system illustrating the operative concepts of the present invention.

The operative concepts of an illumination optical system according to the present invention are described with reference to FIGS. 1–5. A first, plano-convex, lens 1 and a second, plano-concave, lens 2 are mounted coaxially with a lamp 3 and a reflector 4 forming a light beam 5 having an optical axis 6. The reflector is preferably parabolic and the lamp is preferably located at or near the focus FP1 of the parabola so that the resultant light beam is substantially collimated. Practically, however, the light beam will have a small angle of divergence of perhaps four or five degrees. The light beam is incident upon the planar surface 11 of the first lens and is refracted when passing through the convex surface thereof. The convex surface 12 of the first lens has a positive optical power and faces towards the concave surface 13 of the second lens, which has a negative optical power, and the two curved surfaces have matching shapes with equal but opposite optical powers. The shape of the curved surfaces may be spherical, but is preferably aspherical so as to minimize the size of a spot of light at the focus point FP2 of the first lens and to modify the distribution of light through the system, thereby avoiding a "hot spot" in the center of a projected spot of light. The light beam exits the system through the planar output surface 14 of the second lens.

Figure 2:
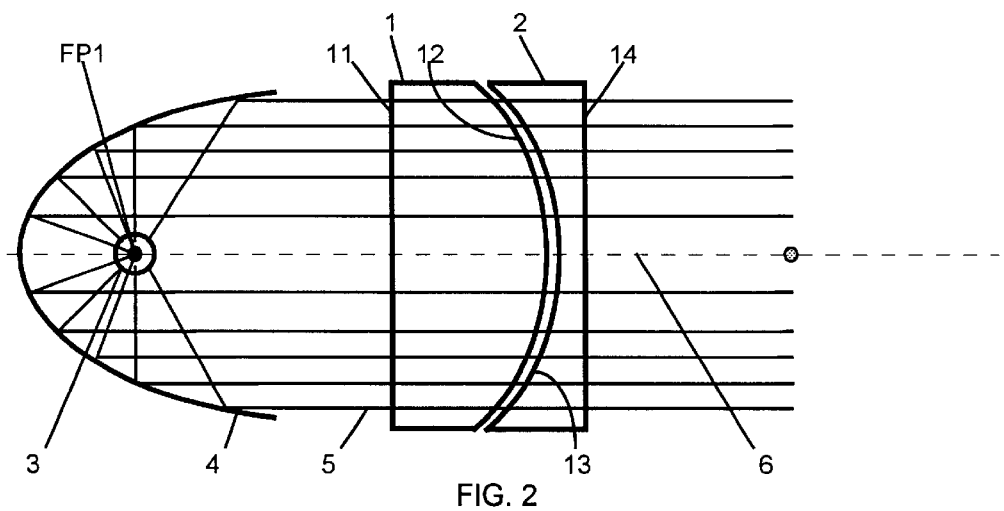
Figure 3:
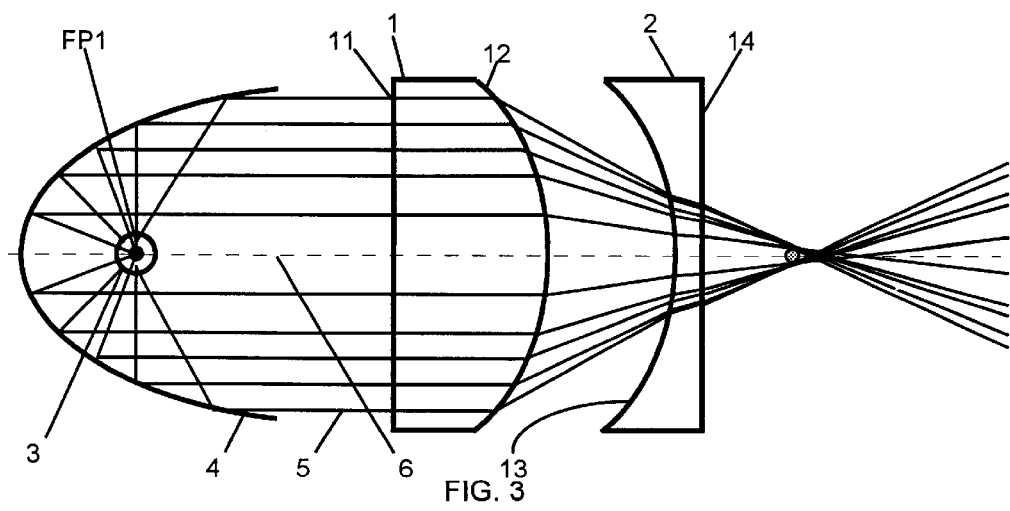

In a "zero-power" state, as shown in FIG. 2, the second lens is positioned as closely as possible to the first lens so that the convex surface of the first lens nests within a volume defined by the concave surface of the second lens. In this zero-power state, the refracting effects of the convex and concave surfaces cancel each other so that the net effect is substantially zero refraction. When the distance between the curved surfaces of the first and second lenses is very small, each light ray passing through the lens system sees nearly the same surface normal after the gap between the lenses as before the gap, and the effect is like that of a light ray passing between two parallel, transparent plates; the net deflection of each light ray is negligible. When the two lenses are separated by a larger distance, as shown in FIG. 3, each light ray passing through the lens system sees a different surface normal after the gap, undergoing deflection by unequal amounts and of opposite signs, and is subject to further deflection at the planar output surface of the second lens for significant net deflection through the system. The amount of net deflection through the system depends, in part, upon the distance of separation between the two curved surfaces.

Figure 4:
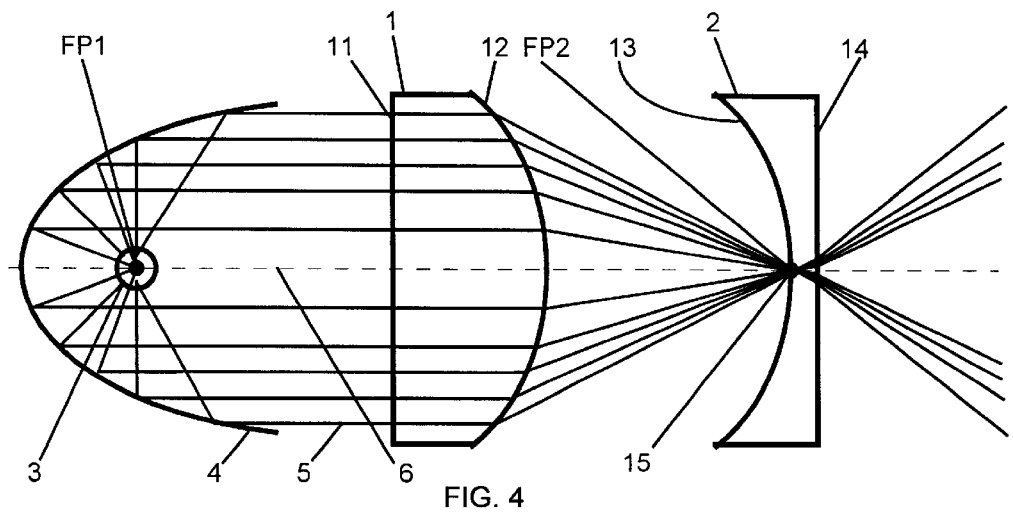
Figure 5:
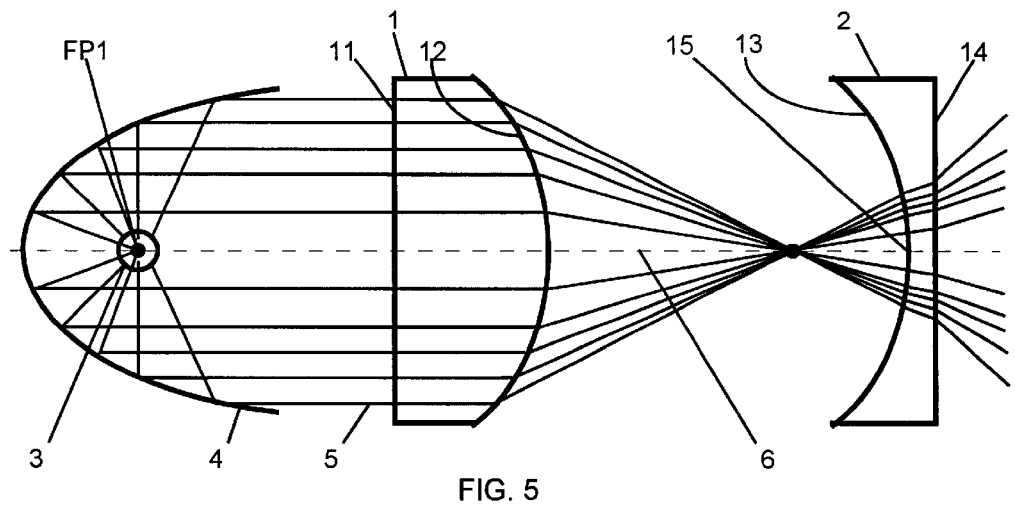

The first lens 1, having a positive optical power, tends to converge the light beam upon a focus point FP2, after which point the light beam will diverge. The second lens 2, having a negative optical power, tends to diverge a collimated light beam. When the apex 15 of the concave surface 13 of the second lens is positioned at the focus point FP2 of the first lens, as shown in FIG. 4, the natural divergence of the light beam after the focus point is amplified by the diverging effect of the second lens. Additional divergence is obtained at the planar output surface 14 of the second lens. When the apex 15 of the second lens is positioned beyond the focus point FP2 of the first lens, as shown in FIG. 5, the diverging part of the light beam is converged slightly through the body of the second lens, but diverges by a great amount as it passes through the planar output surface 14 of the second lens.

The behavior of the light beam passing through the lens system comprising the first, plano-convex, lens 1 and the second, plano-concave, lens 2, is governed by Snell's Law, in accordance with which a light ray passing from air to glass (from a less dense optical medium into a more dense optical medium) is refracted towards the surface normal while a light ray passing from glass to air (from a more dense medium to a less dense medium) is refracted away from the surface normal. The angle of divergence of the light beam is practically zero (assuming a collimated beam emerging from the reflector 4) when the first and second lenses are positioned as closely together as possible, and the angle of divergence increases as the separation between the lenses increases.

Figure 6:
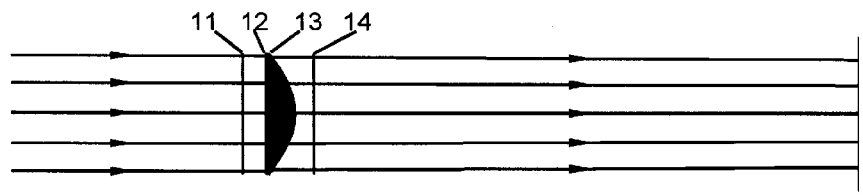
FIGS. 6 through 10 are plan views of a lens system illustrating the performance of one embodiment of the present invention.
Figure 7:
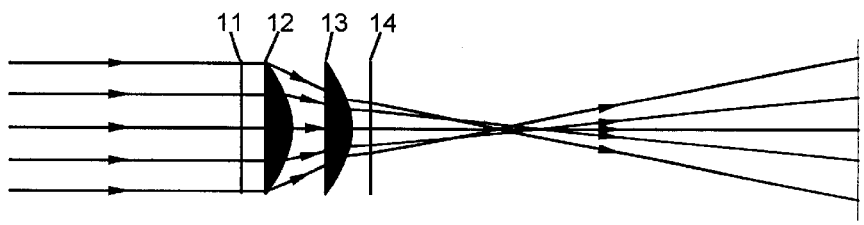
Figure 8:
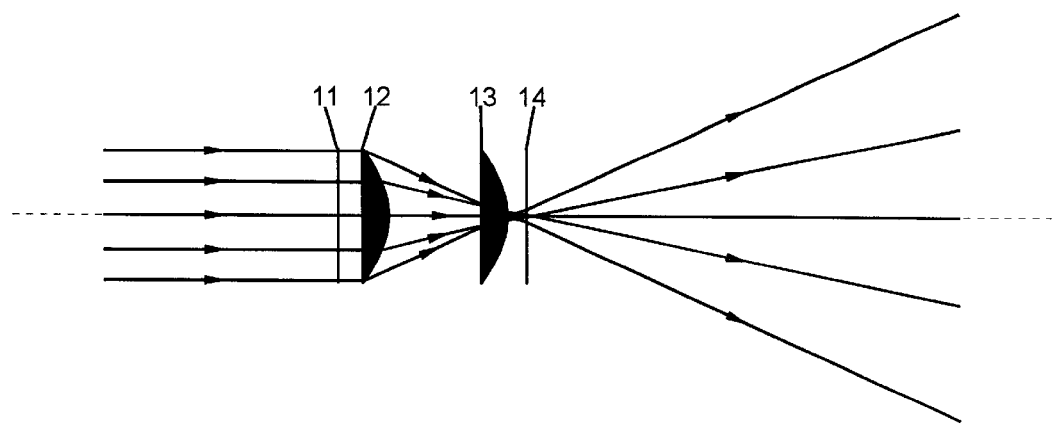
Figure 9:
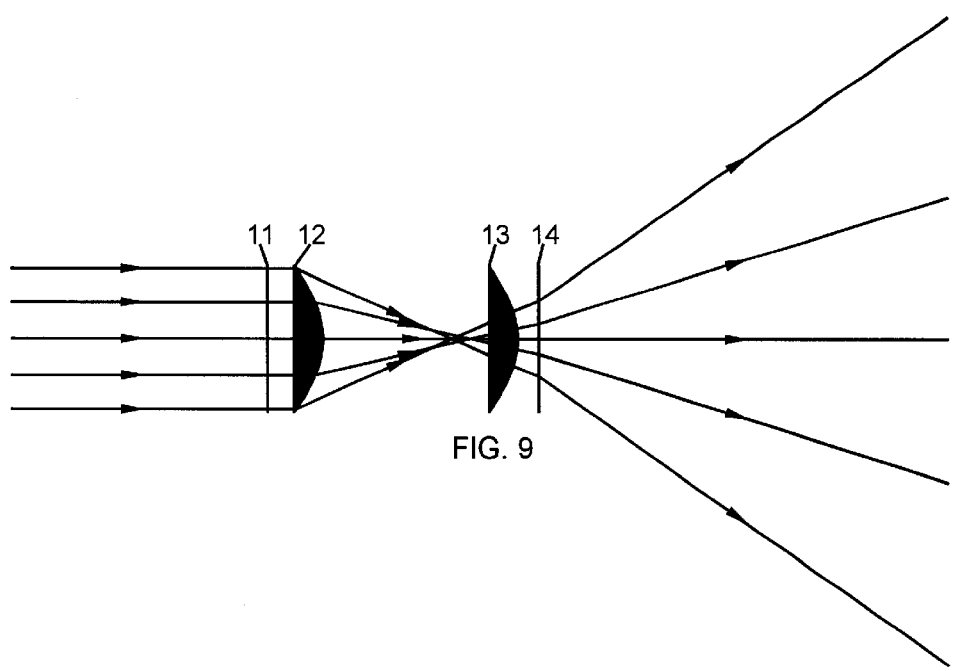
Figure 10:
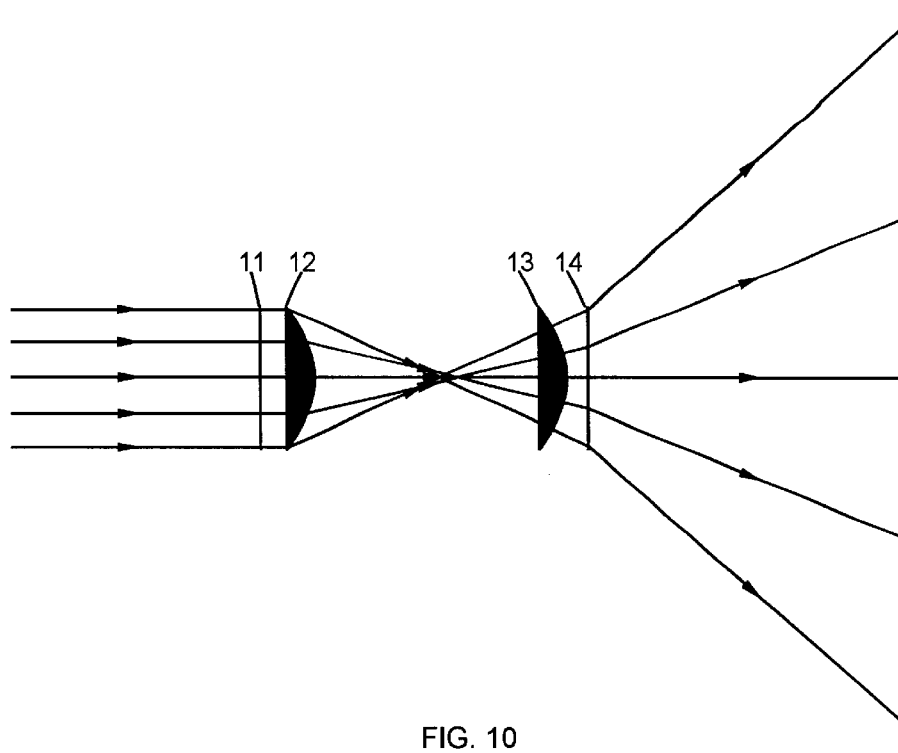

The results of computer simulation modelling the lens system according to the present invention are illustrated in FIGS. 6–10, in which only the planar input surface 11, the convex surface 12, the concave surface 13, the planar output surface 14, and representative rays of the light beam 5 are shown. In this simulation, the curved surfaces are aspheric and have a diameter of approximately 11 mm. In a zero-power state, as shown in FIG. 6, the convex surface 12 and the concave surface 13 are separated by 0.1 mm so that there is no appreciable effect on the angle of beam divergence. Separating the curved surfaces 12 and 13 by 5.25 mm, as shown in FIG. 7, causes appreciable refraction of the light rays such that the beam converges out somewhere along an optical axis of the system and diverges thereafter. In a practical illumination system having a significant throw length, such as in a stage lighting instrument for example, this results in a light beam of significantly enlarged diameter with respect to the zero-power state described above. Separating the curved surfaces 12, 13 even further (10.5 mm), so that the surface 13 lies at the focus point of the surface 12 as shown in FIG. 8, results in an even greater angle of beam divergence. The curved surfaces can be separated further still (15.75 mm), so that the surface 13 lies beyond the focus point of the surface 12 as shown in FIG. 9, which results in a still greater angle of beam divergence. The maximum separation of the curved surfaces (21.0 mm), as shown in FIG. 10, causes peripheral portions of the beam to pass through output surface 14 near the periphery thereof and yields the greatest possible angle of beam divergence for this particular lens system.

Figure 12:
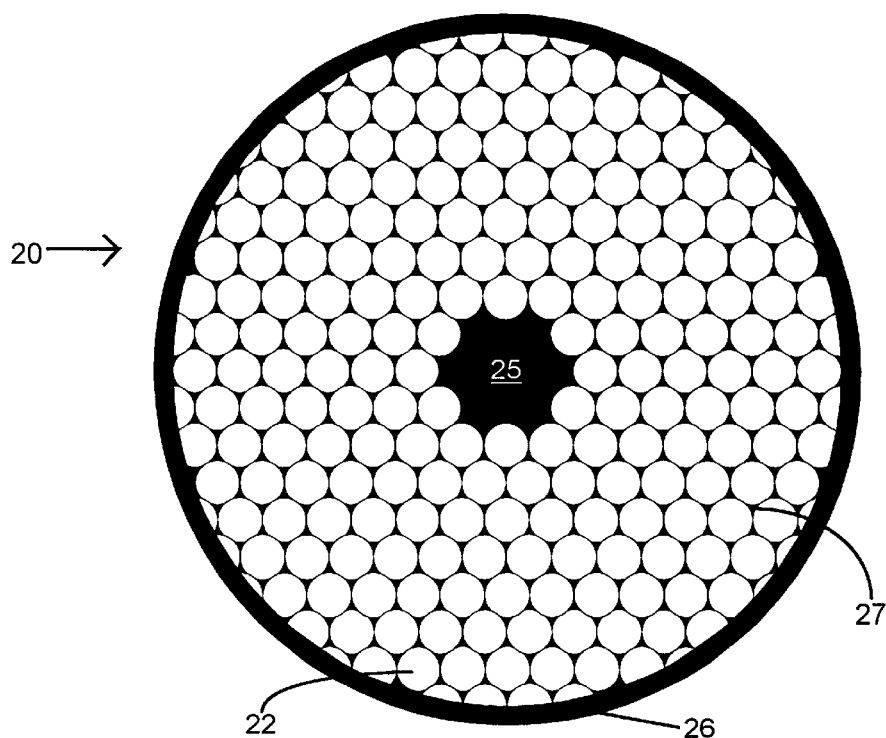
FIG. 12 is a front elevation of a lens array according to the present invention.
Figure 13:
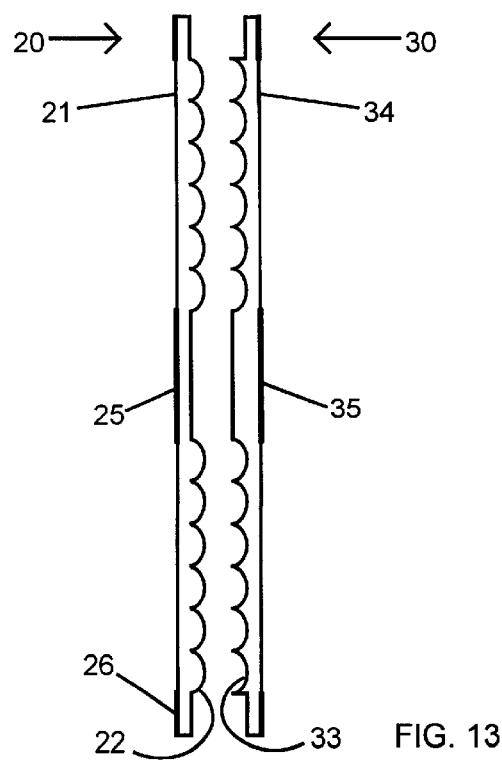
FIG. 13 is a cross-section of a lens array according to the present invention.
Figure 14:
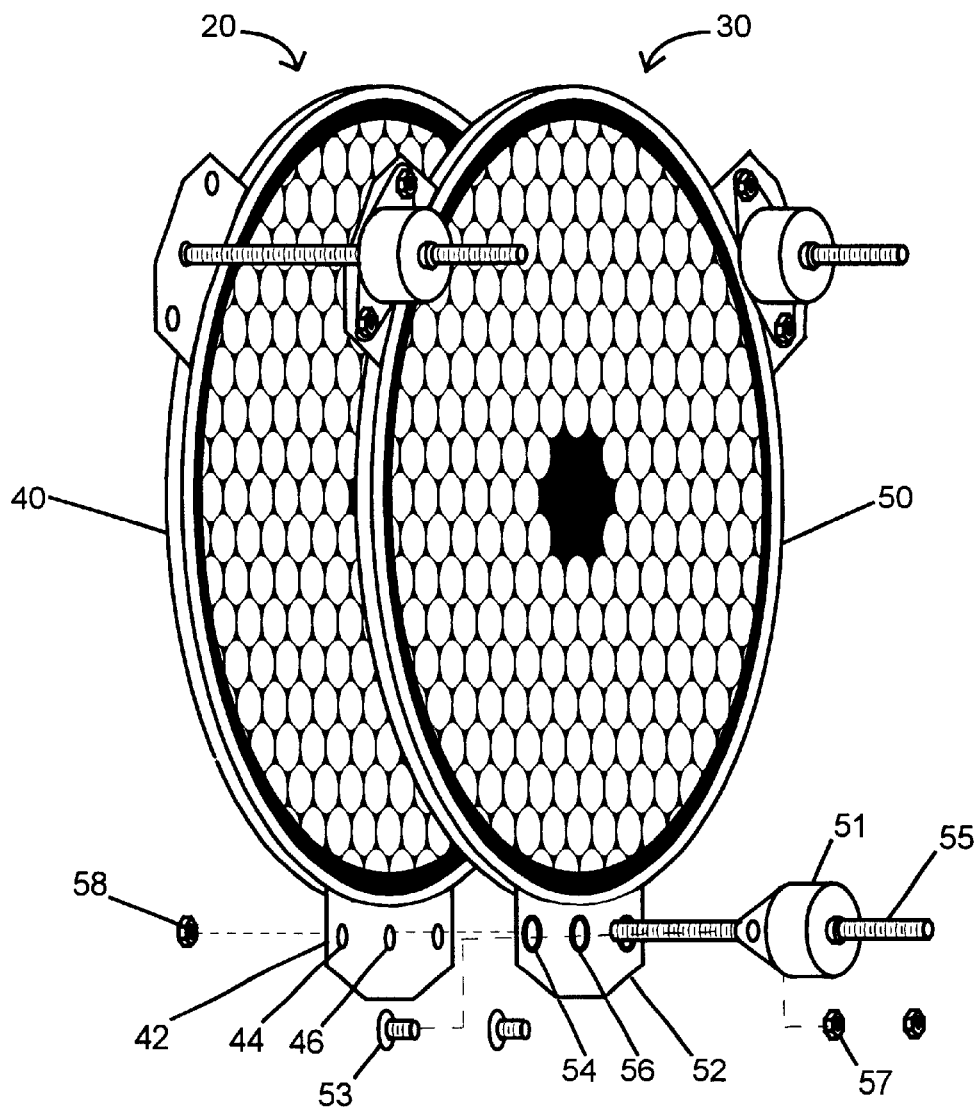
FIG. 14 is a perspective view of a lens system apparatus according to the present invention.

A preferred embodiment of the present invention, as shown in FIGS. 12–14, includes a first multiple-lens array 20 of plano-convex lenslets and a second multiple-lens array 30 of plano-concave lenslets. According to the operative principles of the invention, each positive-power, plano-convex lenslet 22 corresponds to a matching, negative-power, plano-concave lenslet 33 such that the curved, optical-power surfaces of each of the two corresponding lenslets have the same shape. In a zero-power state, the two multiple-lens arrays are positioned as closely together as possible so that there is negligible angle of beam divergence as a light beam passes through the system. As the separation between the two arrays increases, the angle of beam divergence increases. The separation between the two arrays may increase so that the array of negative-power lenslets may lie beyond the focus points of the array of positive-power lenslets. The two multiple-lens arrays are held to be coaxial, and each pair of corresponding positive-power and negative-power lenslets are also held to be coaxial. The lenslets are made small in diameter compared to the diameter of a light beam passing through the array so as to reduce the mass and weight of the glass in the lens system and to reduce the length of travel—a single pair of lenses covering an eight-inch diameter beam would weigh approximately 32 pounds (14.5 kg) and travel about 16 inches (406 mm), whereas an array of small lenslets covering the same beam diameter weighs only about one pound (0.45 kg) and travels less than one inch (25.4 mm).

A practical system may be constructed such that each multiple-lens array comprises a plurality of perimetrically circular lenslets 22 (convex) or 33 (concave) in an hexagonal arrangement as shown in FIG. 12. The perimeters of the individual lenslets have circular shapes and the spaces between the lenslets in this arrangement comprise approximately 10 per cent of the area of the array, through which no significant refraction takes place. Consequently, the area between the perimetrically circular lenslets is preferably masked to avoid a "hot-spot" concentration of un-diverted light rays in the center of a light beam that is subject to a significant angle of beam divergence through the system. Alternatively, an hexagonal array of hexagonally-trimmed lenslets, or perimetrically hexagonal lenslets, avoids a 10 per cent loss of light intensity through the system by avoiding the use of a mask, but the resulting beam through such a system has an hexagonal profile and projects an hexagonal spot of light. As another alternative, the spaces between perimetrically circular lenslets could be covered with additional, secondary, curved optical surfaces with corresponding pairs of matching secondary curved optical surfaces on the two multiple-lens arrays.

The preferred embodiment is economically constructed as a first and second array of perimetrically circular lenslets that are molded, in an hexagonal arrangement, on surfaces of transparent plates and mounted in suitable carriers. An opaque mask is provided for one or both arrays to fill in the spaces between the circular lenslets. As shown in FIGS. 12–13, a mask 25–27 is printed on a flat surface 21 of a transparent plate by a silk-screening process using a suitable ink that can withstand high temperatures. Alternatively, the lenslets may be separately formed and affixed to a transparent substrate using an optically clear cement, and the opaque mask may be a perforated plate having holes corresponding to each of the individual lenslets. The same method of construction is used for the positive lens array and for the negative lens array.

As shown in FIG. 14, a first multiple-lens array 20 is supported within an inward-facing circumferential channel formed in a first mounting ring 40 having a plurality of flanges 42. The mounting ring may be secured to the interior of a luminaire housing by mechanical fasteners installed through mounting holes 44. A second multiple-lens array 30 is similarly supported by a second mounting ring 50, which may be identical to the first mounting ring. Linear actuators 51 are installed upon the flanges 52, secured by mechanical fasteners 53 installed through mounting holes 44 and secured with fasteners 57, with the actuator drive shaft 55 passing through a central hole 56. One end of each actuator drive shaft also passes through central holes 46 formed in the flanges 42 of the first mounting ring 40 and is secured thereto by mechanical fasteners 58. Thus is formed an electrically-operable, motorized mechanism for varying the separation between the two multiple-lens arrays 20 and 30.

The linear actuators are preferably stepper motors such as the Z20841 series motors made by Haydon Switch and Instrument, Inc. of Waterbury, Conn., which are arranged to drive a threaded drive shaft 55 through the body of the motor in response to electrical drive signals. The apparatus may be assembled with the two mounting rings in contact with each other such that the two multiple-lens arrays are properly aligned and at minimal separation for the zero-power state, and the drive shafts can then be secured to the flanges of the first mounting ring. Thereafter, the motors may be wired in series and operated by a suitable controller so that the extension of the various drive shafts remains identical through the range of operation and the multiple-lens arrays are maintained parallel to each other. Limit switches or physical stops may be employed to constrain the operation of the apparatus to within a usable range such as hereinbefore described. The apparatus is preferably remotely controlled via an electronic control system in communication with a supervisory control console such as described in U.S. Pat. No. 4,980,806.

Other types of actuators can also be used, such as electric servo motors, pneumatic or hydraulic actuators, or even manually-operated actuators so long as the separation between the two multiple-lens arrays is controlled within a usable range and the multiple-lens arrays are maintained parallel to each other. The control system might also be capable of operation independently of a supervisory control console or even be free-running, if so desired, to oscillate between two extents of travel. Ideally, however, the apparatus forms part of an automated, multiple-parameter lighting instrument providing remotely-controlled azimuth and elevation adjustment and/or remotely-controlled adjustment of light beam color such as shown, for example, in U.S. Pat. No. 5,367,444.

Figure 11:
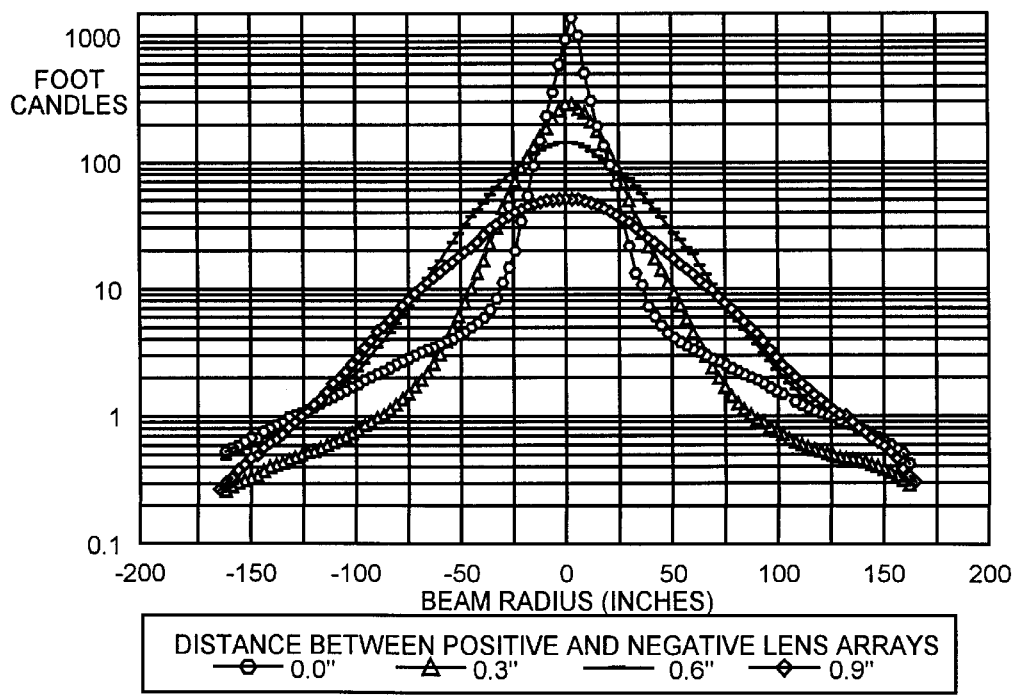
FIG. 11 is a graph showing experimental results from a prototype lens system according to the present invention.

Experimental results obtained from a prototype lens system according to the preferred embodiment are shown in FIG. 11. Four curves superimposed over each other onto a graph relating light intensity in foot-candles (on a logarithmic scale) to beam radius in inches illustrate the distribution of light energy (irradiance) 20 feet (six meters) from the light source. A first curve represents irradiance with the two lens arrays at zero separation, and shows peak light intensity of over 1000 foot-candles in the center of the beam and intensity of about 20 foot-candles at about 25 inches (635 mm) from the center. A second curve represents irradiance with the two lens arrays separated by 0.3 inches (7.6 mm), and shows peak intensity of about 300 foot-candles in the center of the beam and intensity of 20 foot-candles at about 38 inches (965 mm) from the center. A third curve represents irradiance with the two lens arrays separated by 0.6 inches (15 mm), and shows peak intensity of about 150 foot-candles in the center of the beam and intensity of 20 foot-candles at about 60 inches (1524 mm) from the center. A fourth curve represents irradiance with the two lens arrays separated by 0.9 inches (23 mm), and shows peak intensity of about 50 foot-candles in the center of the beam and intensity of 20 foot-candles at about 50 inches (1270 mm) from the center, with slightly more energy content in the fringes of the beam between 75 and 100 inches (762 to 1016 mm) from the center than does the third curve.

The curves of FIG. 11 show that the beam spreader of the preferred embodiment, comprising a first multiple-lens array of piano-convex lenslets and a second multiple-lens array of plano-concave lenslets, effectively controls the distribution of light energy in a light beam. By moving the second multiple-lens array less than one inch (25.4 mm) with respect to the first multiple-lens array, a light beam projected therethrough onto a surface 20 feet (six meters) away can be spread from a highly concentrated beam having most of the light energy confined within a radius of about 25 inches (254 mm) from the center to a very broad beam having light energy distributed throughout a radius of 75 to 100 inches (762 to 1016 mm) from the center.

Figure 15:
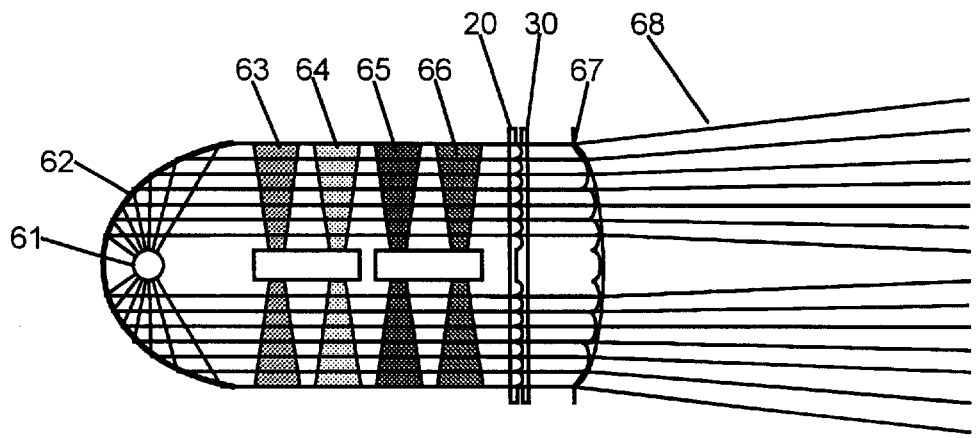
FIGS. 15 and 16 are plan views of a luminaire optical system including a lens system apparatus according to the present invention, and illustrating the operative effects obtained thereby.
Figure 16:
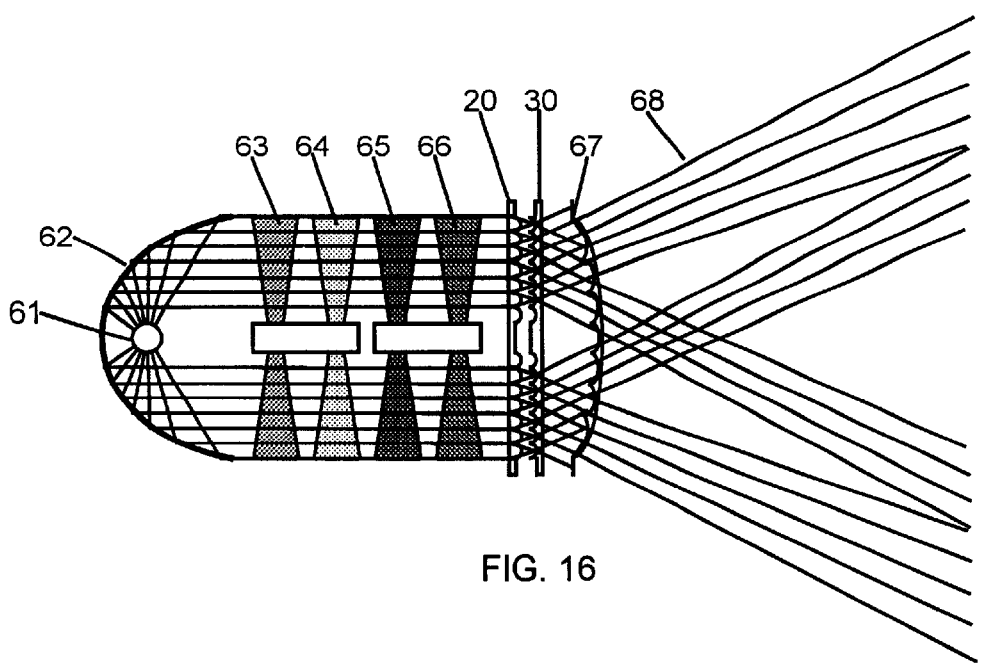

An optical system for a wash luminaire, used in non-imaging illumination applications, as shown in FIG. 15 and FIG. 16, includes a lamp 61 optically coupled to a parabolic reflector 62 forming a substantially columnar light beam. A series of color filters provided downstream of the lamp and reflector may include a set of cyan filters 63, a set of yellow filters 64, and a set of magenta filters 65, further including a set of dimmer vanes 66, in radial arrangement as disclosed in U.S. Pat. No. 5,073,847 or 5,186,536. A zoomable beam spreader comprising first and second multiple-lens arrays 20, 30 is provided downstream of the color filters and dimmer vanes. An output lens 67 covers the exit aperture of the luminaire, the housing of which is not shown but may comprise a ventilated structure of the type disclosed in U.S. Pat. No. 5,367,444.

The system as shown in FIG. 15 illustrates the performance of the beam spreader of the present invention in the zero-power state as multiple-lens arrays 20, 30 are positioned as closely together as possible to project a light beam 68 with only a small angle of beam divergence. The system as shown in FIG. 16 illustrates the performance of the beam spreader of the present invention as the multiple-lens arrays 20, 30 are separated by some distance along the optical axis of the system so as to increase the angle of beam divergence.

The output lens 67 as shown is a well-known type of lenticular lens which shapes the beam to project a non-circular pool of light, but could just as easily be a water-clear lens imparting no appreciable beam divergence or a lightly-stippled lens imparting a small amount of diffusion to the exiting light beam 68. Interchangeable lenses of these types are widely used in the VL5™ luminaire made by Vari-Lite, Inc. of Dallas, Tex. Several different types of lenticular lens are used individually with the VL5 luminaire depending upon the desired beam shape, and the zoomable beam-spreader of the present invention can be used in combination with such a lens to spread the beam in whatever shape is imparted by the lenticular exit lens.

What is claimed is:

1. An apparatus for controlling divergence of a beam of light, comprising:

a first multiple-lens array comprising a plurality of plano-convex lenses arranged in a pattern and supported on a transparent substrate;

a second multiple-lens array comprising a plurality of plano-concave lenses arranged in a pattern and supported on a transparent substrate;

the first and second multiple-lens arrays being formed so that a curvature of convex lens surfaces of the first array matches a curvature of concave surfaces of the second array, and each convex lens surface of the first array corresponds to and is aligned with a matching concave lens surface of the second array;

the first and second multiple-lens arrays being disposed serially and coaxially in a light beam path such that convex lens surfaces of the first array are generally adjacent concave surfaces of the second array;

one of the multiple-lens arrays being movable coaxially with respect to the other of the multiple-lens arrays; and wherein either no substantial transmission or no substantial refraction of the beam of light takes place in any spacing between the plurality of lenses of at least one of the first and the second multiple-lens arrays.

2. The apparatus of claim 1, in which the plano-convex lenses and the plano-convex lenses and the plano-concave lenses are arranged in a substantially hexagonal pattern.

3. The apparatus of claim 1, in which perimeters of the plano-convex lenses and the plano-concave lenses are generally circular.

4. The apparatus of claim 1, in which perimeters of the plano-convex lenses and the plano-concave lenses have a polygonal shape.

5. The apparatus of claim 1, in which areas between the plano-convex lenses and the plano-concave lenses are covered with an opaque masking material.

6. The apparatus of claim 1, in which curvatures of the plano-convex lenses and the plano-concave lenses are spherical.

7. The apparatus of claim 1, in which curvatures of the plano-convex lenses and the plano-concave lenses are aspheric.

8. The apparatus of claim 1, in which the plano-convex lenses and the plano-concave lenses are integrally formed in the transparent substrates.

9. The apparatus of claim 1, in which the plano-convex lenses and the plano-concave lenses are separately formed and are affixed to the transparent substrates.

10. An apparatus for controlling the divergence of a beam of light comprising:

a first lens having a central axis coaxial with the beam of light, having a planar surface incident with and orthogonal to the beam of light and having a convex surface opposing the planar surface, said first lens having a positive optical power; and a second lens having a central axis coaxial with the beam of light, having a concave surface incident with the beam of light after passing through the first lens and having a planar surface opposing the concave surface, the concave surface having a complementary curvature to the convex surface, said second lens having a negative optical power equal to but opposite of said optical power of said first lens, the divergence of the beam of light being controlled by a variable spacing between the first and second lenses wherein a combined optical power of said first and second lenses is substantially zero when said first and second lenses are positioned as closely together as possible.

11. An apparatus as in claim 10 further comprising a linear actuator for moving one of the first and second lenses relative to the other in a direction parallel to the path of the beam of light.

12. An apparatus as in claim 11 wherein the linear actuator comprises a threaded drive shaft actuated by a servomotor.

13. An apparatus as in claim 10 wherein the convex surface of the first lens is aspheric.

14. An apparatus as in claim 10 wherein the convex surface of the first lens is spherical.

15. An apparatus as in claim 10 wherein the beam of light is provided by an apparatus including:
   a concave reflector; and
   a light source positioned at the focal point of the concave reflector.

16. An apparatus as in claim 15 wherein the concave reflector is a parabolic reflector.

17. An apparatus for controlling the divergence of a beam of light comprising:
   a first lens array having a central axis coaxial with the beam of light, said first lens array comprising a planar surface incident with and orthogonal to the beam of light and a plurality of convex surface elements in an array opposing the planar surface;
   a second lens array having a central axis coaxial with the beam of light, said second lens array comprising a plurality of concave surface elements in an array forming a surface incident with the beam of light after passing through the first lens array and a planar surface opposing the concave surface elements, the concave surface elements having a complementary curvature to the convex surface elements, the divergence of the beam of light being controlled by the spacing between the first and second lens arrays; and
   wherein either no substantial transmission or no substantial refraction of the beam of light takes place in any spacing between the plurality of surface elements of at least one of the first and the second lens arrays.

18. An apparatus as in claim 17 further comprising a linear actuator for moving one of the first and second lens arrays relative to the other in a direction parallel to the path of the beam of light.

19. An apparatus as in claim 17 wherein the linear actuator comprises a threaded drive shaft actuated by a servomotor.

20. An apparatus as in claim 17 wherein the convex surfaces of the first lens array are aspheric.

21. An apparatus as in claim 17 wherein the convex surfaces of the first lens array are spherical.

22. An apparatus as in claim 17 wherein the beam of light is provided by an apparatus including:
   a concave reflector; and
   a light source positioned at the focal point of the concave reflector.

23. An apparatus as in claim 22 wherein the concave reflector is a parabolic reflector.

24. A method for controlling divergence of a beam of light, comprising:
   providing a first multiple-lens array comprising a plurality of plano-convex lenses arranged in a pattern and supported on a transparent substrate;
   providing a second multiple-lens array comprising a plurality of plano-concave lenses arranged in a pattern and supported on a transparent substrate;
   the first and second multiple-lens arrays being formed so that a curvature of convex lens surfaces of the first array matches a curvature of concave surfaces of the second array, and each convex lens surface of the first array corresponds to and is aligned with a matching convex lens surface of the second array;
   the first and second multiple-lens arrays being disposed serially and coaxially in a light beam path such that convex lens surfaces of the first array are generally adjacent to and coaxial with concave surfaces of the second array;
   moving one of the multiple-lens arrays coaxially with respect to the other of the multiple-lens arrays; and
   wherein either no substantial transmission or no substantial refraction of the beam of light takes place in any spacing between the lenses of at least one of the first and the second multiple lens arrays.

25. A method for controlling the divergence of a beam of light comprising:
   providing a first lens having a central axis coaxial with the beam of light, having a planar surface incident with and orthogonal to the beam of light and having a convex surface opposing the planar surface, said first lens having a positive optical power;
   providing a second lens having a central axis coaxial with the beam of light, having a concave surface incident with the beam of light after passing through the first lens and having a planar surface opposing the concave surface, the concave surface having a complementary curvature to the convex surface, said second lens having a negative optical power equal to but opposite of said optical power of said first lens; and
   controlling the divergence of the beam of light by varying the spacing between the first and second lenses wherein a combined optical power of said first and second lenses is substantially zero when said first and second lenses are positioned as closely together as possible.

26. A method as in claim 24 wherein the spacing between the first and second lenses is controlled by a linear actuator for moving one of the first and second lenses relative to the other in a direction parallel to the path of the beam of light.

27. A method as in claim 26 wherein the linear actuator comprises a threaded drive shaft actuated by a servomotor.

28. A method as in claim 24 wherein the convex surface of the first lens is aspheric.

29. A method as in claim 24 wherein the convex surface of the first lens is spherical.

30. A method as in claim 24 wherein the beam of light is provided by an apparatus including:
   a concave reflector; and
   a light source positioned at the focal point of the concave reflector.

31. A method as in claim 30 wherein the concave reflector is a parabolic reflector.

32. The apparatus of claim 1 in which said convex surfaces of said first multiple-lens array nest within a volume defined by said concave surfaces of said second multiple-lens array when one of said multiple-lens arrays is moved closely to the other of said multiple-lens arrays.

33. The apparatus of claim 17 in which said plurality of convex surface elements form lenses having a positive optical power, said plurality of concave surface elements form lenses having a negative optical power equal to but opposite of said optical power of said plurality of convex surface elements, and a combined optical power of said pluralities of convex and concave surface elements is substantially zero when said first and second lens arrays are positioned as closely together as possible.

34. A method as in claim 24 wherein said convex surfaces of said first multiple-lens array nest within a volume defined by said concave surfaces of said second multiple-lens array.

* * * * *

UNITED STATES PATENT AND TRADEMARK OFFICE
CERTIFICATE OF CORRECTION

PATENT NO. : 6,282,027 B1
DATED : August 28, 2001
INVENTOR(S) : Hough, Thomas A.

It is certified that error appears in the above-identified patent and that said Letters Patent is hereby corrected as shown below:

Column 2,
Line 41, start a new paragraph beginning with the words "It is never..."
Line 61, delete "," insert -- ; --

Column 7,
Line 11, delete "piano-convex" insert -- plano-convex --

Column 8,
Line 18, delete "and the plano-convex lenses"

Signed and Sealed this

Twenty-third Day of April, 2002

Attest:

Attesting Officer

JAMES E. ROGAN
*Director of the United States Patent and Trademark Office*